Dec. 16, 1924. 1,519,932
G. T. REICH
PROCESS OF PURIFYING FERMENTATION GASES
Filed June 3, 1922
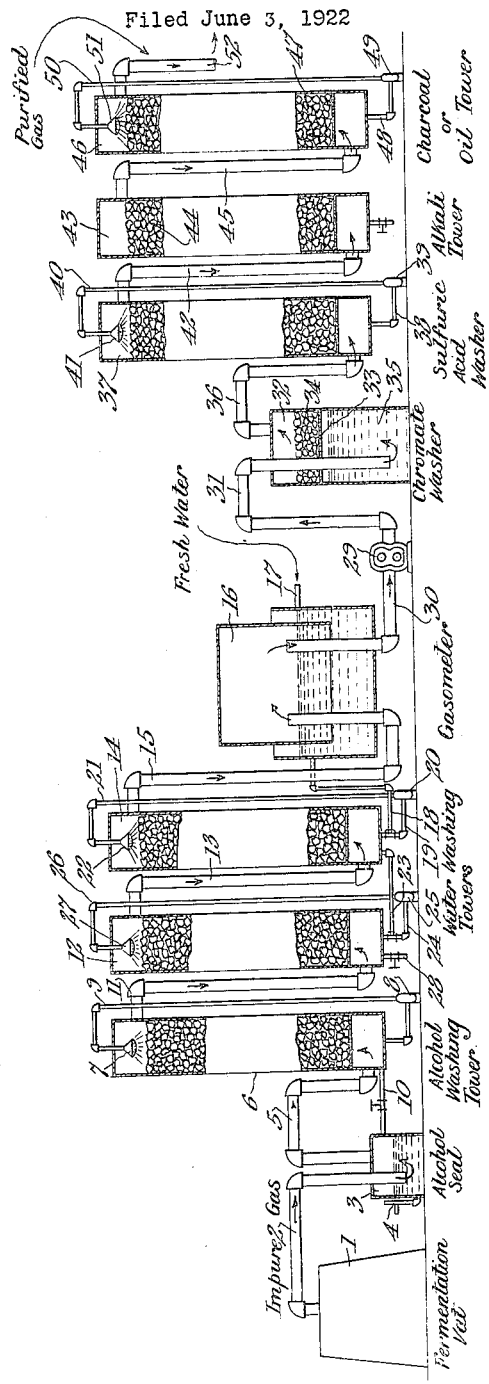

Patented Dec. 16, 1924.

1,519,932

UNITED STATES PATENT OFFICE.

GUSTAVE T. REICH, OF SAUSALITO, CALIFORNIA.

PROCESS OF PURIFYING FERMENTATION GASES.

Application filed June 3, 1922. Serial No. 565,590.

*To all whom it may concern:*

Be it known that I, GUSTAVE T. REICH, a citizen of the United States, residing at Sausalito, in the county of Marin and State of California, have invented certain new and useful Improvements in Processes of Purifying Fermentation Gases, of which the following is a specification.

This invention relates to a process for the purification of carbonic acid gas, resulting from fermentation processes and is particularly directed to the production of an odorless and tasteless gas which will remain odorless and tasteless, even after storage for a long period of time. Such a gas is particularly desirable for use in beverages.

Carbon dioxide gas coming from fermentation processes contains a variety of impurities among which are water, ethyl alcohol, sulphurous gases, ammonia, and materials called empyreumatic substances which impart an unpleasant odor to the gas such as, higher alcohols, compound ethers and esters. The impure gas may be used directly without purification or after partial purification for many industrial purposes but it possesses an odor and taste which renders it unsuitable for use in beverages.

By means of my process, described hereinafter in connection with the accompanying drawings I can produce a carbonic acid gas product which is free from objectionable impurities and which will remain odorless after long storage.

The drawing is a vertical elevation partly in section of the essential parts of a gas purifying plant suitable for carrying out my process.

In the drawing 1 represents the usual fermentation vat which, for the purpose of saving the fermentation gas, is provided with a gas tight cover from which a gas conduit 2 leads to an alcohol seal 3. The alcohol seal 3 is a closed receptacle of any suitable shape provided with an overflow 4 arranged to maintain a constant liquid level about 6 inches above the discharge end of the gas conduit 2. A gas conduit 5 connects the alcohol seal 3 with the bottom of the alcohol washing tower 6 which, as illustrated, is provided with the usual filling or packing material but it is to be understood that any suitable form of gas washer may be employed. The tower 6 is supplied with washing liquid through the spray head 7 to which liquid is supplied from the well or bottom of the tower by means of a pump 8 and pipe 9. Fresh liquid may be supplied to the tower 6 as required by any suitable means for instance, by means of a supply pipe, which is not shown, connected to the intake side of pump 8. Liquid is withdrawn from the well of tower 6 through a pipe 10 to supply the alcohol seal 3.

The gas, after passing through the washing tower 6 is led through the conduit 11, water washing tower 12, conduit 13, water washing tower 14, and conduit 15 to the gasometer 16. Fresh water is continuously supplied to the gasometer through pipe 17 whereby the water in the gasometer is maintained fresh and free from accumulated impurities. The overflow from the gasometer through pipe 18 supplies the wash water for water washing towers 12 and 14. The water is circulated through tower 14 by means of pipe 19, pump 20, pipe 21 and spray head 22 and wash water withdrawn from tower 14 through pipe 23 supplies the tower 12 being circulated therein by means of pipe 24, pump 25, pipe 26 and spray head 27. Wash water is withdrawn from the well of tower 12 through pipe 28.

The passage of the gas through the alcohol seal 3 and towers 6, 12 and 14 to gasometer 16 is accomplished by means of the pressure developed in the fermentation vat and by the suction produced by the gas pump or compressor 29 to which the gas passes from the gasometer by way of conduit 30.

From the compressor 29 the gas is forced through pipe 31 into the washer 32 which is a deep tank containing a solution of a chromate, bichromate or chromic acid 35 and a screen or perforated partition 33 carrying the packing material 34. The gas entering the washer 32 through pipe 31 is discharged into the chromate or chromic acid solution 35 and then passes through the filling 34 and gas conduit 36 into the bottom of a sulfuric acid washing tower 37 in which sulfuric acid is circulated by means of the pipe 38, pump 39, pipe 40, and spray head 41. Fresh acid is supplied and exhausted acid withdrawn from the tower 37 by suitable means not shown.

From the tower 37 the gas passes through conduit 42 into the bottom of a dry tower 43 filled with coke or other material 44 presenting a large surface which has been saturated with sodium carbonate solution and dried. The gas then passes from the coke tower 43 through conduit 45 into the tower 46 filled with charcoal 47 in which an odorless oil such as is used for lubricating compressors is circulated by means of pipe 48, pump 49, pipe 50, and spray head 51. Instead of a single tower 46 for treating the gas with charcoal and odorless oil two separate towers may be employed, the first containing charcoal and the second being simply a washing tower supplied with odorless oil.

The gas after passing through the tower 46 is completely purified and is discharged through the conduit 52 to a compressor not shown and is stored for use.

The treatment of the fermentation gases in the apparatus described above is as follows:

The alcohol seal 3 serves primarily to maintain a uniform back pressure upon the fermentation vat insufficient to retard fermentation but sufficient to prevent the entrance of air into the fermentation gas and to separate entrained mash from the gas. Since the liquid in the alcohol seal is a dilute solution of alcohol coming from the washer 6 it also serves to some extent to remove alcohol and empyreumatic substances from the gas.

In the tower 6 the gas is washed with a dilute aqueous solution of ethyl alcohol, preferably from ½ to 2 per cent for the purpose of removing the bulk of the higher alcohols, esters and ethers which are the primary cause of the objectionable odor of the gas. The removal of these materials from gas by washing with alcohol has been found to be very effective.

The gas is then washed with water in the towers 12 and 14 to remove alcohol and is delivered to the gasometer 16.

From 1 to 4 per cent of the alcohol produced by the fermentation is recovered from the gas in the alcohol seal 3 and in the washers 6, 12 and 14.

In the operation of the process as described above a dilute solution of alcohol is supplied to the washer 6 and the liquid withdrawn from washer 6 serves to supply the alcohol seal 3 while the gasometer 16 is supplied with fresh water and the overflow supplies the washers 12 and 14. The dilute solution of alcohol produced in towers 12 and 14 to some extent assists in the removal of higher alcohols, esters and ethers from the gas. It may be withdrawn through pipe 28 and treated directly for the recovery of alcohol or it may be delivered to the tower 6 and thus serve to supply the whole or a part of the alcohol solution required in the alcohol washing tower 6.

The gas delivered to the gasometer 16 is substantially free from alcohol and empyreumatic substances but it still contains moisture, ammonia and sulfur compounds and the fermented mash odor. The several steps of the process carried out in the apparatus to the right of the gasometer are for the purpose of completing the removal of impurities and for drying the gas.

The successive treatment of the gas with chromate or chromic acid in the washer 32 and with sulfuric acid in the washer 37 serves to completely oxidize the remaining traces of organic impurities in the gas, particularly the higher alcohols, ethers and esters. The sulfuric acid in tower 37 assists the oxidation and also serves to dry the gas and to remove ammonium and sulfur compounds. The small amount of sulfuric acid entrained in the gas in passing through the sulfuric acid washer is removed in tower 43 by contact with the sodium carbonate. The dried acid free gas is then brought into contact with wood charcoal and a neutral odorless oil in the tower 46 for the removal of oxidation products resulting from the action of the chromate or chromic acid solution and sulfuric acid upon the gas and is delivered through the gas conduit perfectly dry, odorless, tasteless and of very high purity.

It will be apparent that the particular procedure and the form and arrangement of apparatus described may be varied considerably without departing from my invention. In the foregoing disclosure I have given merely my preferred procedure and while I regard all of the apparatus and all of the steps of the process described or their equivalents as essential to the complete purification of fermentation gas it is apparent that combinations of less than all of the steps of the process may be employed for the partial purification of a gas or for the removal of certain impurities. For instance, the alcohol seal 3 is not essential. The gas might be supplied directly to the washer 6. Instead of two water washers 12 and 14 a different number might be employed and the gasometer might be omitted. The compressor 29 may be placed in any suitable position for handling the gas. More than one chromate or chromic acid washer and more than one sulfuric acid washer might be employed and means other than the sodium carbonate-coke tower 43 might be employed for freeing the gas from acid.

Various processes have been employed for purifying fermentation gases. For instance they have been washed with water, and oxidized with permanganate solution but such processes so far as I am aware have not been successful in the production of permanently odorless and tasteless gas. I regard the use of dilute alcohol as a washing liquid for the gas; the use of chromate or chromic acid solution followed by treatment with sulfuric acid for oxidizing organic substances and for removing moisture and ammonium and sulfur compounds from the gas; and the absorbing of oxidized organic compounds from the gas by an odorless oil; as the most important steps of my complete process.

I claim:

1. Process of making a permanently odorless and tasteless carbonic acid from fermentation gas which comprises, successively washing said gas with dilute alcohol and water, subjecting the washed gas successively to the action of a solution of a hexavalent chromium compound and sulfuric acid, removing sulfuric acid from said gas, and contacting the same with a material capable of absorbing organic oxidation products.

2. Process of making a permanently odorless and tasteless carbonic acid from fermentation gas which comprises, passing said gas from an air tight fermentation vat through a liquid seal, washing the gas with a solution of ethyl alcohol in water containing from ½ to 2 per cent of alcohol, washing the resulting gas with water, contacting the washed gas successively with a solution of a hexavalent chromium compound and sulfuric acid whereby organic impurities in said gas are oxidized and moisture, ammonium compounds and sulfur compounds are removed from said gas, passing said gas in contact with sodium carbonate, and contacting the gas with wood charcoal and an odorless oil.

3. In a process of purifying fermentation gas, the step which consists in washing the gas with a water solution containing at least ½% of alcohol.

4. In a process of purifying carbonic acid gas containing organic impurities the step which consists in contacting said gas with a solution of a hexavalent chromium compound and sulfuric acid.

5. In a process of purifying fermentation gas the steps comprising, washing said gas with dilute alcohol, and contracting the washed gas successively with a solution of a hexavalent chromium compound and sulfuric acid.

6. In a process of purifying fermentation gas the steps which comprise, passing fermentation gas from a closed fermentation vat into an alcohol seal whereby back pressure is maintained upon said fermentation vat, and washing said gas with a water solution containing at least ½% of alcohol.

7. In a process of purifying fermentation gas comprising washing the gas successively with dilute alcohol and water and delivering the same to a gasometer, the steps which comprise, continuously supplying fresh water to the gasometer and employing the overflow from said gasometer for washing said gas.

8. In a process of purifying carbonic acid gas containing organic impurities the steps which comprise, oxidizing said impurities by contacting the gas with a solution of a hexavalent chromium compound and sulfuric acid, treating the gas with an agent capable of removing sulfuric acid therefrom, and absorbing oxidation products from said gas by contacting the same with charcoal.

9. In a process of purifying carbonic acid gas containing organic impurities the steps which comprise, oxidizing such organic impurities, and contacting the resulting gas with an odorless oil.

10. Process for the purification of fermentation gas which comprises scrubbing the gas with an aqueous solution containing at least ½% of alcohol and thereafter scrubbing the gas with water.

In testimony whereof, I affix my signature.

GUSTAVE T. REICH.